United States Patent
Gerth et al.

(10) Patent No.: US 8,330,078 B2
(45) Date of Patent: Dec. 11, 2012

(54) ELECTRODES INCORPORATING ALUMINUM COATED PARTICLES AND METHODS THEREOF

(75) Inventors: Gregory A. Gerth, Kirtland, OH (US); Patrick T. Soltis, Shaker Heights, OH (US)

(73) Assignee: Lincoln Global, Inc., Cleveland, OH (US)

( * ) Notice: Subject to any disclaimer, the term of this patent is extended or adjusted under 35 U.S.C. 154(b) by 261 days.

(21) Appl. No.: 12/478,849

(22) Filed: Jun. 5, 2009

(65) Prior Publication Data

US 2010/0308028 A1 Dec. 9, 2010

(51) Int. Cl.
*B23K 35/02* (2006.01)

(52) U.S. Cl. ............... 219/145.1; 219/145.22; 219/146.3

(58) Field of Classification Search ............... 219/145.1, 219/145.22, 146.31, 146.3, 146.1, 146.22
See application file for complete search history.

(56) References Cited

U.S. PATENT DOCUMENTS

| | | | | |
|---|---|---|---|---|
| 3,767,891 A | * | 10/1973 | Haverstraw et al. | 219/146.3 |
| 3,769,491 A | * | 10/1973 | De Long et al. | 219/137 R |
| 4,251,711 A | * | 2/1981 | Tanigaki et al. | 219/146.24 |
| 4,426,428 A | * | 1/1984 | Kammer et al. | 428/561 |
| 5,091,628 A | * | 2/1992 | Chai et al. | 219/145.22 |
| 5,118,919 A | * | 6/1992 | Chai et al. | 219/137 WM |
| 5,132,514 A | * | 7/1992 | Chai et al. | 219/145.22 |
| 5,225,661 A | * | 7/1993 | Chai et al. | 219/145.22 |
| 5,260,540 A | * | 11/1993 | Kamimura et al. | 219/76.14 |
| 5,580,475 A | * | 12/1996 | Sakai et al. | 219/145.22 |
| 6,674,047 B1 | * | 1/2004 | Hughes et al. | 219/145.22 |
| 6,933,468 B2 | * | 8/2005 | Keegan et al. | 219/145.22 |
| 7,256,369 B2 | * | 8/2007 | Seitz | 219/146.51 |
| 2003/0196997 A1 | * | 10/2003 | Watanabe et al. | 219/145.22 |
| 2006/0081579 A1 | * | 4/2006 | Kotecki | 219/145.22 |
| 2006/0096966 A1 | * | 5/2006 | Munz et al. | 219/145.22 |
| 2006/0207984 A1 | * | 9/2006 | Karogal | 219/145.22 |
| 2008/0142575 A1 | * | 6/2008 | Cretegny | 228/256 |

FOREIGN PATENT DOCUMENTS

| | | |
|---|---|---|
| EP | 0439179 A1 | 7/1991 |
| GB | 501721 | 3/1939 |
| JP | 4135093 A | 5/1992 |

OTHER PUBLICATIONS

International Preliminary Report, International Application No. PCT/IB2010/001363, mailed on Jun. 15, 2011, 9 pages.
Written Opinion of the International Searching Authority, International Application No. PCT/IB2010/001363, mailed on Sep. 14, 2010, 7 pages.
International Search Report, International Application No. PCT/IB2010/001363, mailed on Sep. 14, 2010, 4 pages.

\* cited by examiner

*Primary Examiner* — M. Alexandra Elve

(74) *Attorney, Agent, or Firm* — Ulmer & Berne LLP

(57) ABSTRACT

A welding electrode and a method of manufacturing the same are provided. The welding electrode includes a metallic electrode portion and a flux portion adjacent and attached to the metallic electrode portion. The flux portion includes a material including particles, wherein each of the particles includes a substrate and an outer layer. The outer layer includes aluminum and substantially coats the substrate.

15 Claims, 1 Drawing Sheet

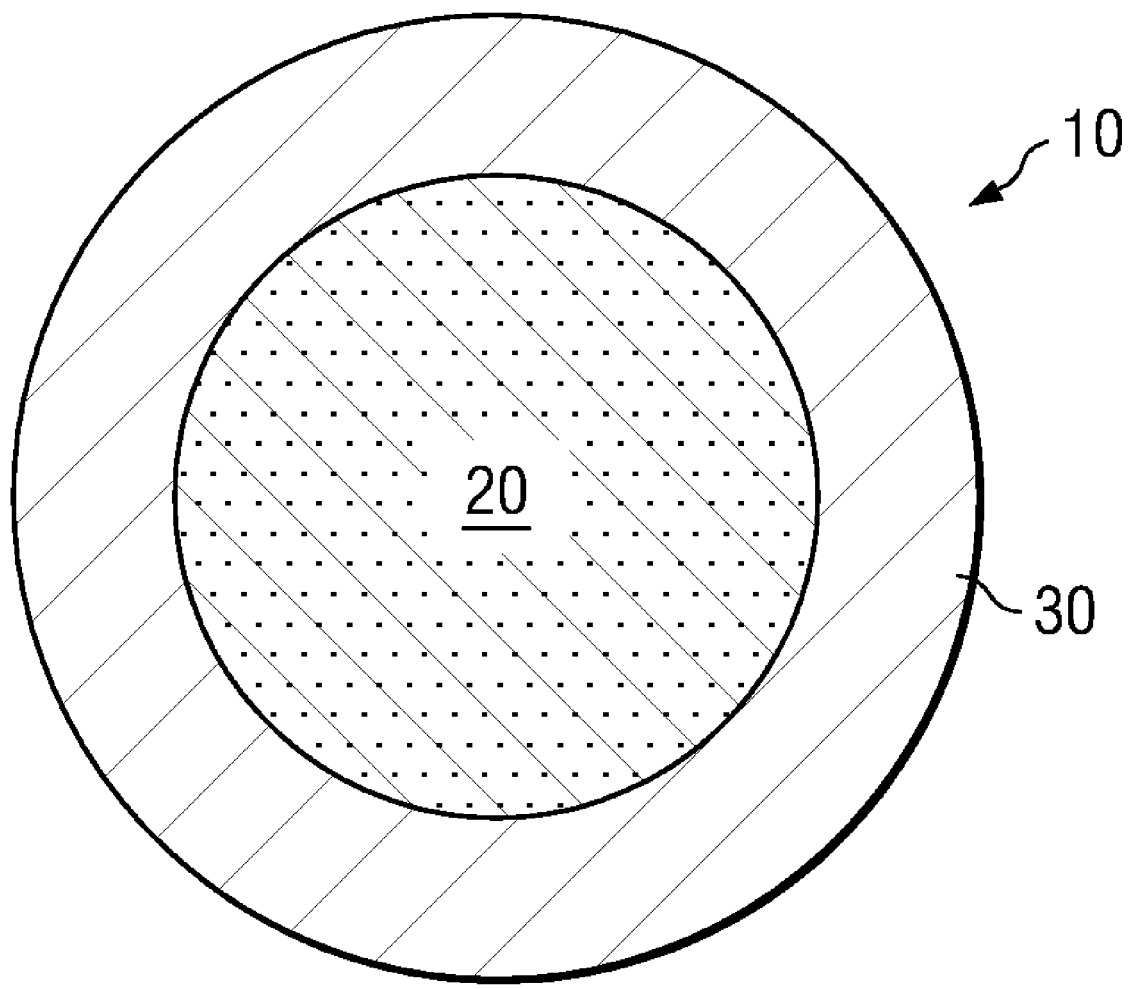

ELECTRODES INCORPORATING ALUMINUM COATED PARTICLES AND METHODS THEREOF

TECHNICAL FIELD

Electrodes and methods are provided for improved weld performance. More particularly, electrodes and methods incorporating materials having aluminum coated particles are provided.

BACKGROUND

Conventional electrodes and methods of manufacturing such electrodes have been available for years. However, while such conventional electrodes and methods somewhat exclude nitrogen and oxygen from entering a weld during a welding process, they do not sufficiently exclude nitrogen and oxygen from a welding arc plasma.

SUMMARY

In accordance with one embodiment, a welding electrode comprises a metallic electrode portion and a flux portion. The flux portion is adjacent and attached to the metallic electrode portion. The flux portion comprises a material comprising particles. Each of the particles comprises a substrate and an outer layer. The substrate comprises a non-metallic powder. The outer layer comprises aluminum and substantially coats the substrate.

In accordance with another embodiment, a method of manufacturing a welding electrode comprises attaching a flux portion to a metallic electrode portion to form a welding electrode. The flux portion comprises a material comprising particles. Each of the particles comprises a substrate and an outer layer. The substrate comprises a non-metallic powder. The outer layer comprises aluminum and substantially coats the substrate.

In accordance with yet another embodiment, a welding electrode comprises a metallic electrode portion and a flux portion. The flux portion is adjacent and attached to the metallic electrode portion. The flux portion comprises a material comprising particles. Each of the particles comprises a substrate and an outer layer. The outer layer comprises aluminum and substantially coats the substrate. The outer layer is added to the substrate by chemical vapor deposition.

BRIEF DESCRIPTION OF THE DRAWINGS

While the specification concludes with claims particularly pointing out and distinctly claiming the invention, it is believed that the same will be better understood from the following description taken in conjunction with the accompanying drawing in which:

FIG. 1 is a cross-sectional view depicting a welding electrode in accordance with one embodiment.

DETAILED DESCRIPTION

Selected embodiments are herein described in detail in connection with the drawing of FIG. 1. FIG. 1 illustrates a cross-section of a welding electrode 10. Welding electrode 10, as illustrated in FIG. 1, depicts an embodiment of a flux-cored electrode in which a flux portion 20 can be substantially surrounded by a metallic electrode portion 30 and the flux portion 20 can serve as a core of the electrode 10. In the configuration represented in FIG. 1, the flux portion 20 can be employed to provide a shielding gas during a welding operation in order to exclude nitrogen from entering a weld metal, which can be accomplished by shielding air from the weld pool during the welding operation. These types of welding electrodes are generally known as self-shielding electrodes. Self-shielding electrodes are used in many different types of welding operations, such as flux-cored arc welding ("FCAW"). In one embodiment, a flux portion can range from about 5% to about 50% by weight of an electrode. In another embodiment, a flux portion can range from about 10% to about 30% by weight of an electrode.

In a welding process, an electrode generates its own shielding gas, via a material forming a flux portion, to remove oxygen and nitrogen from the area of the molten weld pool. A shielding gas is generated by compounds contained in a flux portion which decompose and/or vaporize during welding. The released gas reduces the partial pressure of nitrogen and oxygen in the welding arc environment so that absorption of nitrogen and oxygen from the weld pool is reduced.

To achieve the exclusion of nitrogen from a weld metal, conventional self-shielding electrodes contain a certain quantity of aluminum in either a flux portion, a metallic electrode portion, or both portions. The presence of aluminum aids in blocking nitrogen and oxygen from the weld metal and preventing brittle welds, which are undesirable in many applications. As such, an electrode is needed having a composition which blocks the entry of nitrogen into a weld metal and does not close or significantly interfere with the phase transfer of a weld metal during a welding operation.

In one embodiment, a flux portion can include a material which includes particles, wherein each particle includes a substrate substantially coated with an outer layer. The outer layer can comprise aluminum, thus forming an aluminum coated particle. In one embodiment, the substrate can include a non-metallic powder such as an oxide compound and/or a fluoride compound. The oxide compound can include lithium oxide. The fluoride compound can include barium fluoride and/or calcium fluoride. In another embodiment, a second layer can be added to the substrate prior to the addition of the outer layer, for example, the second layer can be a moisture barrier layer. The addition of a moisture barrier layer can be used to prevent the premature degradation of the non-metallic powder. In one embodiment, the moisture barrier layer can comprise iron, manganese, nickel and/or any other suitable moisture barrier component.

In one embodiment, an aluminum coated particle can have a diameter ranging from about 50 µm to about 300 µm. In one embodiment, a substrate of a particle can range from about 70% to about 95% by weight of the particle. In another embodiment, a substrate of a particle can range from about 80% to about 88% by weight of the particle. In one embodiment, an outer layer of a particle can range from about 5% to about 30% by weight of the particle. In another embodiment, an outer layer of a particle can range from about 12% to about 20% by weight of the particle. In one embodiment, an outer layer of a particle can have a thickness ranging from about 2 µm to about 10 µm.

Aluminum coated particles as described herein can be prepared in a variety of ways. In one embodiment, the aluminum coated particles can be formed by chemical vapor deposition. Chemical vapor deposition can be a chemical process used to produce high-purity, high-performance solid materials. In a typical chemical vapor deposition process, a substrate is exposed to one or more precursors, which react and/or decompose on the substrate surface to produce the desired deposit layer, for example, aluminum. In one embodiment, an aluminum layer can be deposited on a substrate through a reaction involving tri-isobutyl aluminum and/or tri-ethyl aluminum. In another embodiment, the aluminum coated particles can be formed by physical vapor deposition. Physical vapor deposition can include any type of method to deposit thin films by some form of condensation of a vaporized form of a material (e.g., aluminum) onto various surfaces (e.g., substrate surface). In one embodiment, the coating method used in physical vapor deposition can involve physical processes such as high temperature vacuum evaporation or plasma sputter bombardment.

The presence of aluminum coated particles in the flux portion 20 can provide for a reduction of aluminum used in the welding electrode 10 illustrated in FIG. 1. In applications, such as welding, aluminum coated particles can act as denitriders and deoxidizers to eliminate nitrogen and oxygen from a weld pool. For example, aluminum coated particles can remove more oxygen and nitrogen from a weld pool, resulting in cleaner weld metal having enhanced physical properties. Having aluminum delivered in a flux portion via aluminum coated particles can provide more uniform distribution of the aluminum in the core of the electrode and can provide for a larger surface area making the aluminum more chemically reactive. Thus, in one embodiment, at least some of the aluminum which would normally be present in a flux portion of an electrode is replaced with aluminum coated particles. In one embodiment, a flux portion comprises up to about 5% to about 30% by weight of aluminum coated particles. In yet another embodiment, a flux portion comprises about 12% to about 20% by weight of aluminum coated particles. Of course, the overall percentage of aluminum coated particles present in a flux portion of an electrode can be a function of the electrode type, desired performance and construction.

In one embodiment aluminum coated particles can completely replace aluminum in the overall electrode. Thus, if a conventional electrode comprises about 10% aluminum by weight of a flux portion, one embodiment of an electrode can comprise about 10% aluminum coated particles by weight of a flux portion with no added aluminum. Of course, it will be appreciated by those of ordinary skill in the art that, due to various manufacturing techniques, trace amounts of aluminum may exist in an electrode as a function of manufacturing processes and the materials used. Thus, the amount of intentionally added aluminum can be replaced with aluminum coated particles.

As illustrated in the example shown in Table 1, as the fraction of aluminum from aluminum coated particles increases in a flux portion, the amount of nitrogen and oxygen present during the welding process decreases.

TABLE 1

| Percentage of aluminum in flux portion from aluminum coated particles (wt %) | Amount of nitrogen present | Amount of oxygen present |
|---|---|---|
| 19 | 0.0182 | 0.00510 |
| 35 | 0.0170 | 0.00450 |
| 50 | 0.0160 | 0.00395 |
| 66 | 0.0148 | 0.00336 |
| 81 | 0.0137 | 0.00280 |

Thus, the use of a material having aluminum coated particles in a flux portion of an electrode can provide for the reduction of the amount of aluminum present in a welding electrode without reducing the shielding performance of the welding electrode and without any adverse metallurgical effects in the resulting weld. In fact, using electrodes in accordance with various embodiments discussed herein can result in improved metallurgical properties over conventional electrodes because the overall amount of aluminum remaining in the weld is reduced.

In addition to the aluminum coated particles, in one embodiment other compounds such as aluminum metal powders and/or aluminum alloy powder (e.g., 55% Al, 45% Mg) can also be included in a flux portion. In one embodiment, the amount of aluminum from the aluminum coated particles in a flux portion ranges from about 10% to about 100% by weight of the total aluminum in the flux portion. In another embodiment, the amount of aluminum from the aluminum coated particles in a flux portion ranges from about 19% to about 81% by weight of the total aluminum in the flux portion.

It is noted that, depending on the reactivity of aluminum coated particles, the percentages of aluminum coated particles utilized in an electrode may need to be adjusted to achieve a desired performance. Thus, it will be appreciated that one skilled in the art can determine the appropriate amount of aluminum coated particles employed, whether the aluminum coated particles is combined with aluminum, or is used by itself in forming a particular electrode. As such, the overall amount of aluminum coated particles used can be a function of the desired performance of an electrode with regard to its ability to provide the needed deoxidization and denitridation and produce a weld having desirable metallurgical properties, such as toughness.

Aluminum coated particles can generally be amorphous thus placement of aluminum coated particles in a material forming a flux portion of a welding electrode is convenient from a manufacturing perspective. Aluminum coated particles can be added to a flux portion of a welding electrode during a mixing process to form the flux portion being added to the electrode. A flux portion is then added to form a final welding electrode during a manufacturing process. As discussed herein, a flux portion can be substantially surrounded by a metallic electrode portion and serve as a core of an electrode. It will be appreciated that a metallic electrode portion can be formed from any suitable metal compound(s) and/or alloy(s) used in any applicable welding applications. Moreover, an electrode can be manufactured to serve many welding applications, and, as such, it will be appreciated by one skilled in the art that the physical dimension of an electrode (e.g., the diameter of the electrode) and integration of a flux portion as part of an electrode are similar to that of known welding electrodes.

The foregoing description of embodiments and examples has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate various embodiments as are suited to the particular use contemplated. It is hereby intended that the scope of the invention be defined by the claims appended hereto.

What is claimed is:

1. A welding electrode comprising:
   a) a metallic electrode portion; and
   b) a flux portion adjacent and attached to the metallic electrode portion, wherein the flux portion comprises a flux material comprising particles, wherein each of the particles comprises a substrate, an outer layer and a barrier layer disposed between the substrate and the outer layer, wherein the substrate comprises a non-metallic powder, the non-metallic powder comprising at least one of an oxide compound and a fluoride compound, wherein the outer layer comprises aluminum and substantially coats the substrate, and wherein the barrier layer prevents moisture from contacting the substrate.

2. The welding electrode of claim 1, wherein the fluoride compound is selected from the group consisting of barium fluoride, calcium fluoride and mixtures thereof.

3. The welding electrode of claim 1, wherein the oxide compound comprises lithium oxide.

4. The welding electrode of claim 1, wherein the barrier layer comprises at least one of iron, manganese, and nickel.

5. The welding electrode of claim 1, wherein the substrate is coated with the outer layer by chemical vapor deposition.

6. The welding electrode of claim 1, wherein the substrate is coated with the outer layer by physical vapor deposition.

7. The welding electrode of claim 1, wherein the metallic electrode portion defines a core, wherein the flux portion is located within the core of the metallic electrode portion and the metallic electrode portion substantially surrounds the flux portion.

8. The welding electrode of claim 1, wherein the flux portion ranges from about 5% to about 50% by weight of the welding electrode.

9. The welding electrode of claim 8, wherein the flux portion ranges from about 10% to about 30% by weight of the welding electrode.

10. The welding electrode of claim 1, wherein the outer layer of the particle ranges from about 5% to about 30% by weight of the particle.

11. The welding electrode of claim 10, wherein the outer layer of the particle ranges from about 12% to about 20% by weight of the particle.

12. The welding electrode of claim 1, wherein the material of the flux portion further comprises aluminum metal powder or aluminum alloy powder.

13. The welding electrode of claim 1, wherein the outer layer has a thickness ranging from about 2 μm to about 10 μm.

14. The welding electrode of claim 1, wherein the substrate ranges from about 80 wt % to about 88 wt % of the particle.

15. The welding electrode of claim 1, wherein each particle has a diameter from about 50 μm to about 300 μm.

* * * * *